United States Patent [19]
Beckwith et al.

[11] Patent Number: 5,371,592
[45] Date of Patent: Dec. 6, 1994

[54] LASER INTENSITY MONITORING APPARATUS WITH METALLIC THIN FILM MASK

[75] Inventors: Timothy A. Beckwith, Coon Rapids; Ruth A. May, Stillwater; Peter J. Kinsella, Minneapolis, all of Minn.

[73] Assignee: Honeywell, Inc., Minneapolis, Minn.

[21] Appl. No.: 843,756

[22] Filed: Feb. 28, 1992

[51] Int. Cl.$^5$ ............................................ G01C 19/66
[52] U.S. Cl. .................................................. 356/350
[58] Field of Search ................ 356/350; 372/94, 107

[56] References Cited

U.S. PATENT DOCUMENTS

| | | |
|---|---|---|
| 4,152,072 | 5/1979 | Hutchings. |
| 4,514,832 | 4/1985 | Vescial .............................. 356/350 |
| 4,676,643 | 6/1987 | Vescial .............................. 356/350 |
| 4,871,253 | 10/1989 | Killpatrick et al. ................. 356/350 |

FOREIGN PATENT DOCUMENTS

| | | |
|---|---|---|
| 0390180 | 10/1990 | European Pat. Off.. |
| 2379805 | 9/1978 | France. |
| 2100055 | 12/1982 | United Kingdom ................ 356/350 |
| 2156070 | 3/1985 | United Kingdom. |

Primary Examiner—Samuel A. Turner
Attorney, Agent, or Firm—Craig J. Lervick

[57] ABSTRACT

The present invention relates to a laser intensity monitor. Specifically the laser intensity monitor uses a black chrome metallic, non-light transmissive mask deposited on an optically transparent glass or sapphire window. The mask has an aperture there through. The mask is positioned on the window in such a manner that only the TEM$_{00}$ mode of a counter-rotating laser beam is allowed to pass through the aperture of the mask and the window to strike a photodetector.

14 Claims, 2 Drawing Sheets

LASER INTENSITY MONITORING APPARATUS WITH METALLIC THIN FILM MASK

FIELD OF THE INVENTION

The present invention relates to a ring laser gyroscope and more particularly to a laser intensity monitoring apparatus.

BACKGROUND OF THE INVENTION

Examples of ring laser gyroscopes are shown and described in U.S. Pat. No. 3,373,650 issued to J. Killpatrick and U.S. Pat. No. 3,390,606 issued to T. Podgorski. An integral part of a ring laser gyro is the laser beam source or generator. One type of laser generator comprises electrodes and a gas discharge cavity in combination with a plurality of mirrors which establishes an optical closed loop path. The gas discharge cavity is generally formed by a laser block having a plurality of interconnecting tunnels or bores.

Present day ring laser gyros employ a gas discharge cavity filled with a lasing gas which is ionized when excited by an electric current passing from one electrode to another through the lasing gas. If the plurality of mirrors are properly aligned, two counter-propagating laser beams will be established, traveling in opposite directions along the optical closed loop path. Each counter-propagating laser beam may consist of several light beams sometimes referred to as spatial modes. The centermost mode, commonly referred to as the $TEM_{00}$ mode (and also referred to as the fundamental or primary spatial mode), contains the greatest amount of energy and is of greatest value to the operation of the ring laser gyro.

One embodiment of a ring laser gyro system includes a device called a path length controller that is capable of making slight alterations to the length of the optical closed loop path by changing the distance between the plurality of mirrors. To ensure that the path length is properly set, a laser intensity monitor is appropriately coupled to the discharge cavity in order to observe the intensity of a portion of one of the counter-propagating laser beams exiting through one of the plurality of mirrors. Desirably, the laser intensity monitor should be sensitive to only the $TEM_{00}$ mode of the laser beam exiting the mirror. Based on the intensity of the $TEM_{00}$ mode, the path length is regulated so that the $TEM_{00}$ mode always contains the maximum amount of energy possible.

To achieve this, only the $TEM_{00}$ mode of one of the counter-propagating laser beams is monitored. If more than one spatial mode was monitored simultaneously, the ring laser gyro might attempt to adjust the path length so as to maximize the energy in a mode other than the $TEM_{00}$ mode. This would cause the ring laser gyro to give less precise readings, than if only the $TEM_{00}$ mode was being monitored.

Heretofore, a laser intensity monitoring apparatus consisted of a photodetector contained within a package which comprised an enclosure in which the photodetector is mounted. The enclosure further included a transparent window generally parallel to, and in front of, the photosensitive surface of the photodetector. A mylar mask is attached to the outer surface of the transparent window with an adhesive. The mylar mask is similar to a photographic negative which is generally opaque with an aperture of a size and shape that will only allow the $TEM_{00}$ mode to pass through.

Generally, the photodetector package is rigidly attached to the mirror substrate having a partially transmissive mirror. The mirror substrate is rigidly fixed to the laser block which provides the discharge cavity. The photodetector package is appropriately positioned relative to the portion of the laser beam exiting through the mirror, as aforesaid, such that the photodetector is responsive to the laser beam.

Unfortunately, this assembly with the mylar mask has presented several problems. First, great difficulty is encountered in getting the mask to remain flat on the transparent window. Because an adhesive is used to attach the mask to the window, air bubbles, which may cause deleterious optical effects, become trapped between the mask and the window. Moreover, the ends of the mask also have a tendency to curl. These effects are further exacerbated when the monitor is subjected to changing temperature because of the difference between the mylar mask's and the window's thermal coefficients of expansion. Further, not only is the mylar mask difficult to clean, but it also fogs when exposed to radiation. In addition, imperfections of the mylar mask can cause light scattering leading to gyro performance errors.

SUMMARY OF THE INVENTION

In the invention of the present application, a laser beam intensity monitor is comprised of a photodetector package enclosing a photodetector. The package includes a window for forming, in part, an outer member of the photodetector package, and for permitting light to impinge on a photodetector secured within the photodetector package. In order to discriminate against certain spatial modes of impinging light beams, a thin film nonreflective metallic mask is deposited on the window with an aperture of a selected size and shape. The thin film metallic mask may be deposited on either side of the window which forms, in part, the interior wall or the exterior wall surface of the package. The use of a thin film nonreflective metallic mask minimizes light scattering, and is well suited for space applications since it is substantially unaffected by radiation.

DETAILED DESCRIPTION OF THE INVENTION

Figure 1:
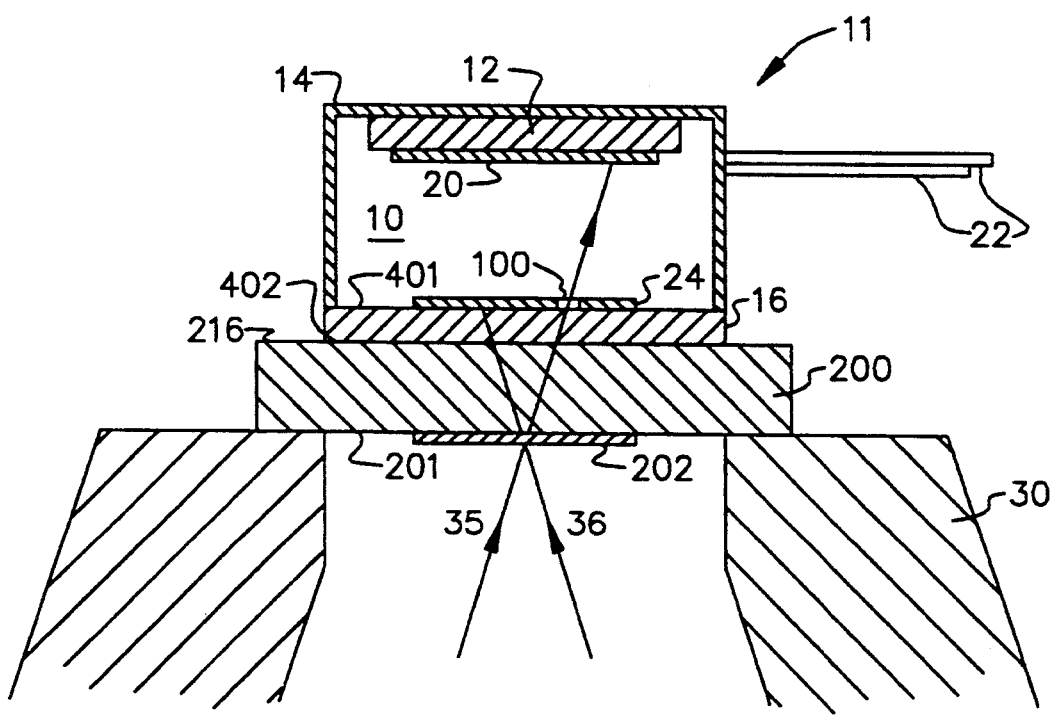
FIG. 1 is a cross sectional view of a ring laser gyroscope illustrating one embodiment of a laser intensity monitor of the present invention.

FIG. 1 illustrates a method of employing the photodetection laser intensity monitoring apparatus 10 of the present invention as part of a ring laser gyroscope. As described earlier, a laser block 30 along with a plurality of mirrors including mirror 202 provides a pair of counter-propagating laser beams 35 and 36 as particularly described in U.S. Pat. No. 3,390,606 issued to T. Podgorski.

As illustrated in FIG. 1, optically transmissive substrate 200 is fixed to block 30. Transmissive substrate 200 includes opposite major surfaces 201 and 216. First major surface 201 is suitably polished and optically coated to provide a partially transmissive mirror 202 for reflecting a major portion of beam 36, in a direction opposite of beam 35. Similarly, a major portion of beam 35 is reflected in the direction opposite of beam 36.

Also illustrated in FIG. 1, the laser intensity monitoring apparatus 10 in accordance with the present invention is comprised of a photodetector package 11 for hermetically enclosing or environmentally protecting a photodetector 12 having a photosensitive element or surface 20. The photodetector package includes an opaque rigid, cup-shaped enclosure 14 and an optically transparent window 16 having first and second opposite surfaces 401 and 402, respectively, which form in part an interior surface and an exterior surface of the photodetector package, respectively. Further, window 16 includes a thin film nonreflective metallic mask 24 deposited on the surface 401 of window 16. As will be more fully described, thin film nonreflective metallic mask 24 illustrated in FIG. 5 is substantially opaque and includes an aperture 100 of a selected size and shape for passing light therethrough.

The photodetector package 11 is rigidly fixed to substrate 200 such that transparent window 16 is juxtaposed to surface 216. With photodetector package 11 and aperture 100 of mask 24 properly aligned, light beams transmitted through mirror 202 and emerging therefrom will pass through transparent window 16 and aperture 100 to impinge upon the photosensitive surface 20 of photodetector 12. As a result of mask 24, only the light from one of the counter-propagating laser beams, e.g. beam 35, as illustrated in FIG. 1, is allowed to impinge upon photosensitive surface 20 of photodetector 12. As the intensity of the light of the impinging beam changes, photodetector 12 will vary its output accordingly.

Figure 5:
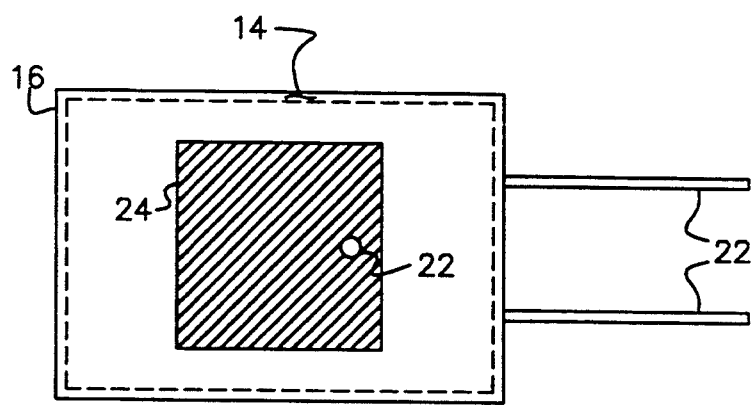
FIG. 5 is a plan view of the photodetection laser intensity monitoring apparatus of FIG. 4.

Referring now to FIG. 5, thereshown is a partial plan view of the window side of the photodetector package—the photodetector not being shown. A thin film nonreflective metallic mask 24 is deposited on interior surface 401 of transparent window 16. Black chrome is the preferred nonreflective metallic film because of its low reflectivity, although other nonreflective metals that are well known in the pertinent art could be used. Preferably the thin film nonreflective metallic mask 24 can be deposited on the transparent window 16 by a thin film vacuum deposition technique such as ion beam sputtering, e-beam evaporation, and the like, that are well known thin film deposition techniques. A printing process, also a well known technique, can likewise be used to apply the thin film nonreflective metallic mask 24. The thin film nonreflective metallic mask 24 is generally a few Angstroms to several mils thick. The thickness is selected based on both the size of the discharge cavity and the power output characteristics of the laser generated in the cavity. The aperture 100 is generally a few Angstroms to a few mils in diameter. The size of the aperture 100 is also selected based on the size of the discharge cavity and the power of the laser, among others, which determine the spatial dimensional characteristics of the spatial modes. In the present invention, satisfactory results may be obtained with the film thickness being such as to allow only 0.3% or less light transmission and that the metallic film have 15% or less reflectivity (ie. 85% absorption).

The thin film nonreflective metallic mask 24 provides an aperture 100 to permit spatial mode discrimination of the intensity of the laser beam as aforesaid. It should be understood that the aperture may be of any shape as long as it permits only light from one of the counter-propagating laser beams to impinge on the photodetector. In the preferred embodiment of the invention, the aperture would be of such a shape as to permit only the TEMhd 00 mode of the laser beam to pass therethrough, The thin film nonreflective metallic mask 24 deposited on transparent window 16 replaces the mylar mask heretofore employed. Of course, the elimination of the mylar mask also eliminates the bonding process that was required to attach the mask to the transparent window 16. Furthermore, the nonreflective metallic 24 deposited on the transparent window 16 is a more durable mask, and is easier to clean than previously used mylar. Moreover, the laser intensity monitoring apparatus 10 is able to operate in a broad temperature range, because the thermal coefficient of expansion for the nonreflective metallic mask 24 is more like that of the transparent window 16 than previously used mylar. Thus, aperture 100 in the nonreflective metallic mask 24 will be less distorted then an aperture in the mylar mask, when subjected to an identical temperature change. Furthermore, the glass surface of the transparent window 16 provides a much flatter surface, and allows the deposition of a precise pattern, which diminishes scattering, and reduces reflections. This, in turn, increases overall gyro performance. The thin film nonreflective metallic mask 24 deposited directly on the glass makes the mask resistant to radiation such that the mask will not fog when exposed to radiation as does a mylar mask.

Figure 2:
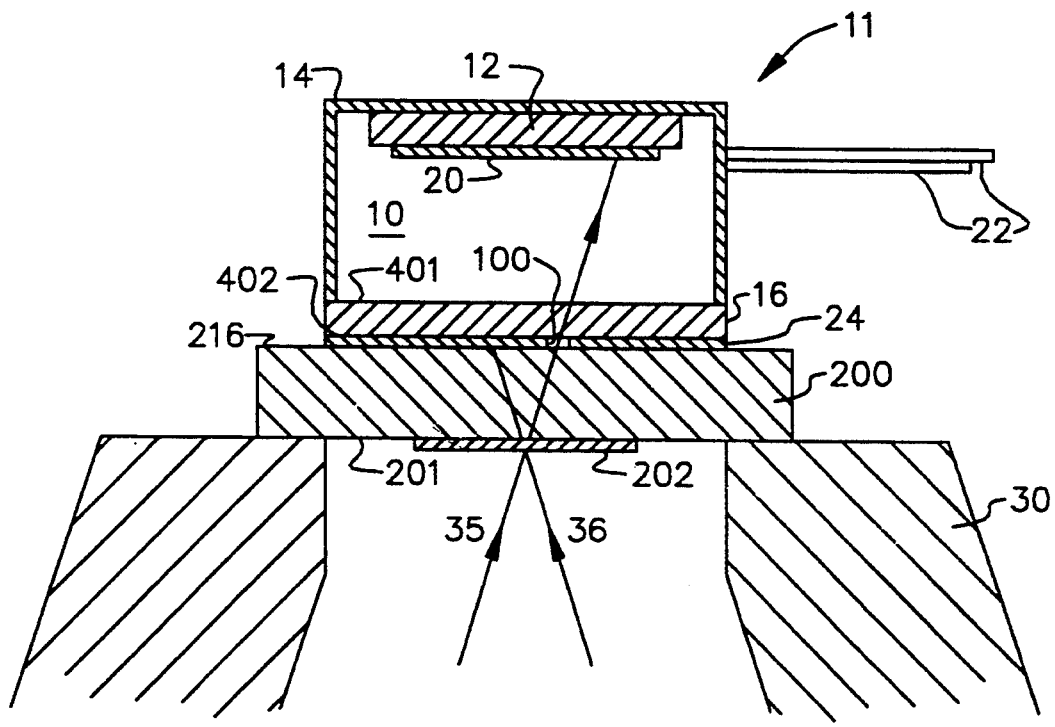
FIG. 2 is a cross sectional view of a ring laser gyroscope illustrating another embodiment of a laser intensity monitor of the present invention.

FIG. 2 illustrates an alternate embodiment of laser intensity monitoring apparatus 10 of the present invention. The embodiment of FIG. 2 has components of FIG. 1 with the same numerical designations. The embodiment illustrated in FIG. 2 is identical to the embodiment described in FIG. 1 except that the thin film nonreflective metallic mask 24 is deposited on surface 402 of transparent window 16, instead of surface 401. Although the thin film mask 24 is illustrated as covering the whole window, it is not required to effect proper bonding to substrate 200.

Figure 3:
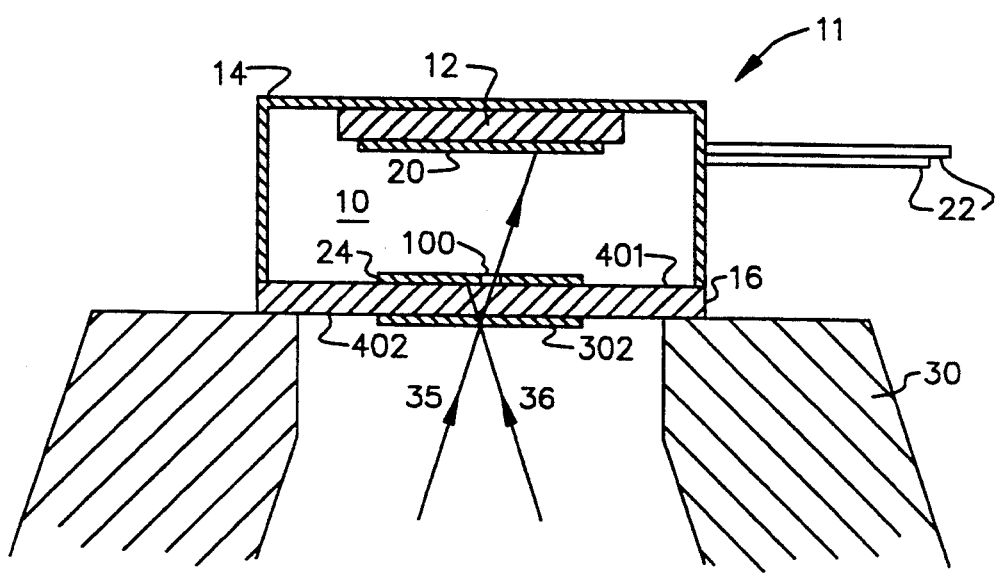
FIG. 3 is a cross sectional view of a ring laser gyroscope illustrating another embodiment of a laser intensity monitor of the present invention.

Still another embodiment of the invention is illustrated in FIG. 3 having components of FIG. 1 retaining the same numeral designations. However, in FIG. 3, window 16 serves as and replaces mirror substrate 200 of FIG. 1. As illustrated in FIG. 3, photodetector package 10 is fixed directly to laser block 30 for receiving light beams as will now be described. Transparent window 16 includes a major surface 402 which is rigidly fixed to laser block 30 by an optical cement, frit seal, or other securing means. Window surface 402 is suitably polished and also optically coated to provide partially transmissive mirror 302 which serves in the same manner as mirror 202 of FIG. 1. Transparent window 16 also includes a major surface 401 opposite that of major surface 402, which forms in part an interior surface of the photodetector package 11.

A thin film nonreflective metallic mask 24, similar to that already described with reference to FIGS. 1 and 5, is deposited on window surface 401 of transparent window 16 in a manner similar to that already described with reference to FIG. 1. With the aperture 100 of mask 24 appropriately in line relative to either of beams 35 or 36, the laser intensity monitoring apparatus, including the combination of photodetector package 11, along with mirror 302 deposited on window 16, and photosensitive surface 20 of photodetector 12, will monitor the intensity of the light of the impinging beam in the same manner as that aforesaid.

Figure 4:
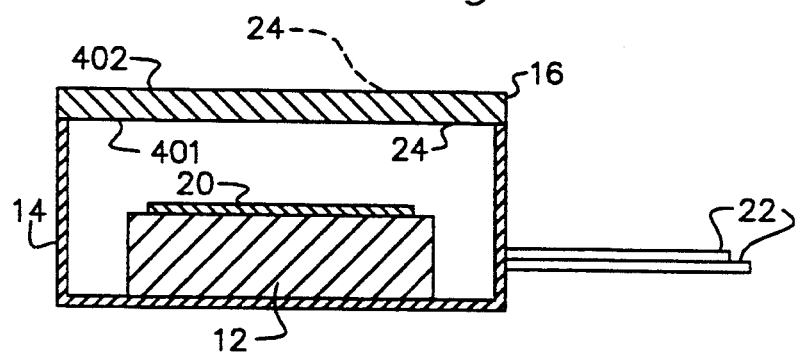
FIG. 4 is a cross sectional view of the photodetection laser intensity monitoring apparatus of another embodiment of the present invention.

Referring now to FIG. 4, thereshown is a side view of the photodetection laser intensity monitoring apparatus 10 which contains photodetector 12. The photodetector package 11 comprises the cup-shaped enclosure 14 along with transparent window 16 which hermetically seals or environmentally protects photodetector 12 within the package. Thin film nonreflective metallic mask 24, in accordance with the present invention and illustrated in FIG. 5, is deposited on either of transparent window 16 surfaces 401 or 402. As illustrated, transparent window 16 is relatively parallel with the photosensitive surface 20, although the geometrical relationship therebetween is not critical. Photodetection laser intensity monitoring apparatus 10 has a plurality of leadwires 22 extending from the enclosure 14. Leadwires 22 are electrically connected (not shown) to photodetector 12 to provide photodetector output signals responsive to the intensity of the light impinging on photosensitive surface 20.

It should be noted that photodetector 12 is an available component from UDT Corporation (part No. PIN7788-1 or PIN7788-2). Because these components are dual photodetectors, it is necessary to electrically connect them so that the two elements operate as a single element. It should be pointed out that a single element photodetector would work equally as well as the two components specified above. Furthermore, enclosure 14 is a component available from NTK Corporation (part No. ITK03FL-0044A), and transparent window 16 may be fabricated by Kyocera Corporation. The assemblage of such components is commonly employed in ring laser gyros manufactured by Honeywell Inc.

While the present invention has been disclosed in connection with the preferred embodiment thereof, it should be understood that there may be other embodiments which fall within the spirit and scope of the invention as defined in the following claims.

What is claimed is:

1. A laser intensity monitoring apparatus for attachment to a ring laser gyroscope block, the laser intensity monitoring apparatus comprising:
   a photodetector responsive to a laser beam impinging on a sensitive surface thereof;
   a photodetector package attached to the ring laser gyro block, said phtotdetector package enclosing said photodetector and securing said photodetector thereto, and wherein said photodetector package includes a transparent window having first and second surfaces forming in part an interior and exterior surface of said photodetector package, respectively, and said window positioned relative to said photodetector such that said photodetector is responsive to said laser beam passing through said transparent window; and
   a substantially opaque thin film nonreflective metallic mask deposited upon a selected on of said first and second surfaces of said transparent window, said mask including an aperture wherein said selected size and shape of said aperture substantially allows only one selected spatial mode of said laser beam to impinge on said photodetector.

2. The laser intensity monitoring apparatus of claim 1 wherein said transparent window is a selected glass material.

3. The laser intensity monitoring apparatus of claim 1 wherein said transparent window is sapphire or a sapphire like material.

4. The laser intensity monitoring apparatus of claim 1 wherein said nonreflective metallic mask is black chrome.

5. The laser intensity monitoring apparatus of claim 1 wherein said thin film nonreflective metallic mask is located on said first surface of said transparent window and a partially transmissive mirror is deposited on said second surface of said transparent window.

6. A ring laser gyro comprising:
   a laser block for providing a pair of counter-propagating laser beams;
   a transmissive mirror substrate rigidly fixed to said block including at least one partially transmissive mirror means for substantially reflecting said counter-propagating laser beams impinging thereon to establish in part, an optical closed loop path, and for transmitting a first laser beam being a portion of at least one of said counter-propagating laser beams impinging on said mirror means; and
   a photodetection laser intensity monitoring apparatus including,
      a photodetector responsive to at least a portion of said first laser beam impinging on a sensitive surface thereof;
      a photodetector package enclosing said photodetector and securing said photodetector thereto, wherein said photodetector package includes a transparent window having first and second surfaces forming in part an interior and exterior surface of said photodetector package, respectively, said second surface being attached to said mirror substrate on a side opposite to said mirror means;
      a substantially opaque thin film nonreflective metallic mask deposited upon a selected on of said first and second surfaces of said transparent window, said mask including an aperture having a selected size and shape, wherein said selected size and shape of said aperture substantially allows only one selected mode of said laser beam to impinge on said photodetector; and
      said mask is positioned relative to said photodetector such that said photodetector is responsive to that portion of said selected spatial mode of said first laser beam passing through said transparent window and said aperture.

7. The laser intensity monitoring apparatus of claim 6 wherein said transparent window is a selected glass material.

8. The laser intensity monitoring apparatus of claim 6 wherein said transparent window is sapphire or a sapphire like material.

9. The laser intensity monitoring apparatus of claim 6 wherein said nonreflective metallic mask is black chrome.

10. A ring laser gyro comprising;
    a laser for providing a pair of counter-propagating laser beams;
    a photodetector responsive to a laser beam impinging on a sensitive surface thereof;

a photodetector package enclosing said photodetector and securing said photodetector thereto, and wherein said photodetector package includes a transparent window having first and second surfaces forming in part an interior and exterior surface of said photodetector package, respectively;

a substantially opaque thin film nonreflective metallic mask deposited upon said first surface of said transparent window, said mask including an aperture having a selected shape and size for permitting light to pass therethrough;

a partially transmissive mirror means rigidly fixed to said second surface of said transparent window;

i) said photodetector package rigidly fixed to said laser block such that said transmissive mirror means is positioned for substantially reflecting said counter-propagating laser beams impinging thereon to establish, in part, an optical closed loop path, and for transmitting a first laser beam being a portion of at least one of said counter-propagating laser beams impinging on said mirror means, and ii) said aperture of said thin film nonreflective metallic mask is positioned relative to said first laser beam such that said photodetector is responsive to a selected spatial mode of said first laser beam passing through said window and said aperture.

11. The ring laser gyro of claim 10 wherein said transparent window is a selected glass material.

12. The ring laser gyro of claim 10 wherein said transparent window is sapphire or sapphire like material.

13. The ring laser gyro of claim 10 wherein said nonreflective metallic mask is black chrome.

14. The ring laser gyro of claim 10 wherein said transparent window is rigidly fixed directly to said laser block.

* * * * *

UNITED STATES PATENT AND TRADEMARK OFFICE
CERTIFICATE OF CORRECTION

PATENT NO.   :   5,371,592

DATED        :   December 6, 1994

INVENTOR(S)  :   TIMOTHY A. BECKWITH, PETER J. KINSELLA, RUTH A. MAY

It is certified that error appears in the above-identified patent and that said Letters Patent is hereby corrected as shown below:

Title page item, cancel the Assignee "Honeywell, Inc." and substitute
   [73]                                    --Honeywell Inc.--

Column 5, line 65, cancel "on" and substitute --one--.

Column 6, line 43, cancel "on" and substitute --one--.

Signed and Sealed this

Thirteenth Day of June, 1995

Attest:

BRUCE LEHMAN

Attesting Officer

Commissioner of Patents and Trademarks